(12) United States Patent
Badders et al.

(10) Patent No.: US 6,615,876 B2
(45) Date of Patent: Sep. 9, 2003

(54) REINFORCED HOSE AND ASSOCIATED METHOD OF MANUFACTURE

(75) Inventors: Scott L. Badders, Liberty, MO (US); John R. Aull, Excelsior Springs, MO (US); Doug M. Brock, Excelsior Springs, MO (US)

(73) Assignee: Gilmour, Inc., Newark, DE (US)

( * ) Notice: Subject to any disclaimer, the term of this patent is extended or adjusted under 35 U.S.C. 154(b) by 0 days.

(21) Appl. No.: 09/838,611

(22) Filed: Apr. 19, 2001

(65) Prior Publication Data

US 2001/0039972 A1 Nov. 15, 2001

Related U.S. Application Data

(60) Provisional application No. 60/202,710, filed on May 10, 2000.

(51) Int. Cl.⁷ .............................................. F16L 11/00
(52) U.S. Cl. ...................... 138/125; 138/129; 138/137; 138/149
(58) Field of Search ................................. 138/124, 125, 138/129, 137, 149

(56) References Cited

U.S. PATENT DOCUMENTS

| | | | |
|---|---|---|---|
| 2,899,982 A | 8/1959 | Harpfer | |
| 3,130,753 A | 4/1964 | Monnen | |
| 3,194,274 A | 7/1965 | Griffiths et al. | |
| 3,245,431 A | 4/1966 | Coe | |
| 3,289,703 A | 12/1966 | Brown | |
| 3,540,486 A | 11/1970 | Flounders | |
| 3,547,162 A | 12/1970 | Schaerer | |
| 3,561,493 A | 2/1971 | Maillard et al. | |
| 3,599,677 A | 8/1971 | O'Brien | |
| 3,677,303 A | * 7/1972 | Martin | 138/109 |
| 3,805,848 A | 4/1974 | Chrow | |
| 3,811,477 A | 5/1974 | Thawley | |
| 3,869,338 A | 3/1975 | Kavesh | |
| 3,902,531 A | 9/1975 | Thawley | |
| 3,927,695 A | 12/1975 | Crockwell | |
| 3,957,085 A | 5/1976 | Ball | |
| 3,994,761 A | 11/1976 | Higbee | |
| 4,007,070 A | 2/1977 | Busdiecker | |

(List continued on next page.)

FOREIGN PATENT DOCUMENTS

| | | |
|---|---|---|
| EP | 0 775 862 | 5/1997 |
| EP | 0 794 377 | 9/1997 |
| FR | 1 356 848 | 3/1964 |
| GB | 922116 | 3/1963 |
| WO | WO 99 41537 | 8/1999 |

*Primary Examiner*—James Hook
(74) *Attorney, Agent, or Firm*—Maginot, Moore & Bowman

(57) ABSTRACT

A hose includes a tube assembly surrounded by a textile reinforcement that is surrounded by a cover assembly. The tube assembly includes an inner non-foamed layer that is surrounded by a foamed layer that is surrounded by an outer non-foamed layer. The textile reinforcement surrounds the outer non-foamed layer of the tube assembly and preferably consists of a first spiral threading and a second mesh threading. The cover assembly includes an inner non-foamed layer that is surrounded by a foamed layer that is surrounded by an outer non-foamed layer. The adjacent relationship of the outer non-foamed layer of the tube assembly and the inner non-foamed layer of the cover assembly provide a substantial increase in adhesion between the two assemblies. Further, this configuration reduces the tendency for water seepage between the layer or plies that can cause bubbles and separation. Still further, the present configuration allows the foam layers to be blown with lighter densities for softness and reduced weight while not compromising hose integrity. Even further, the present configuration improves hose strength with a concomitant reduction in the amount of textile reinforcement.

12 Claims, 4 Drawing Sheets

U.S. PATENT DOCUMENTS

| | | | |
|---|---|---|---|
| 4,044,799 A | * 8/1977 | Higbee et al. | 138/125 |
| 4,091,063 A | 5/1978 | Logan | |
| 4,148,342 A | 4/1979 | Welsby | |
| 4,153,079 A | 5/1979 | Ambrose | |
| 4,154,266 A | 5/1979 | Tanaka et al. | |
| 4,196,464 A | 4/1980 | Russell | |
| 4,239,064 A | * 12/1980 | Gilman | 138/154 |
| 4,243,075 A | 1/1981 | McPherson et al. | |
| 4,273,160 A | * 6/1981 | Lowles | 138/124 |
| 4,304,268 A | * 12/1981 | Gilman | 138/154 |
| 4,322,260 A | 3/1982 | Conlon | |
| 4,351,366 A | 9/1982 | Angioletti | |
| RE31,047 E | 10/1982 | Ross | |
| 4,380,252 A | 4/1983 | Gray et al. | |
| 4,603,712 A | 8/1986 | Krause | |
| 4,644,977 A | 2/1987 | Arterburn | |
| 4,706,712 A | 11/1987 | Oglesby et al. | |
| 4,842,024 A | 6/1989 | Palinchak | |
| 4,874,648 A | * 10/1989 | Hill et al. | 428/35.9 |
| 4,998,565 A | 3/1991 | Kokuryu et al. | |
| 5,324,557 A | * 6/1994 | Lupke | 138/121 |
| 6,071,579 A | * 6/2000 | Green et al. | 138/126 |

* cited by examiner

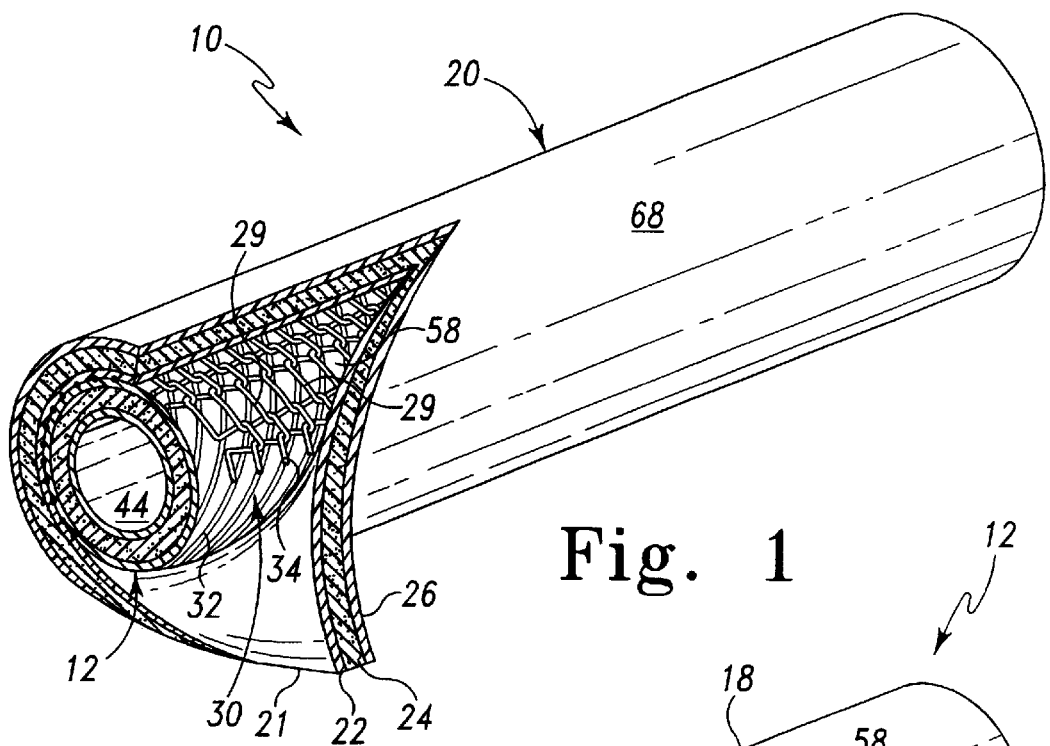
Fig. 1
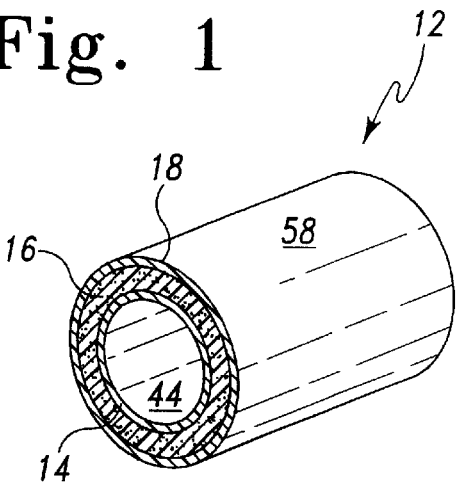
Fig. 2
Fig. 3
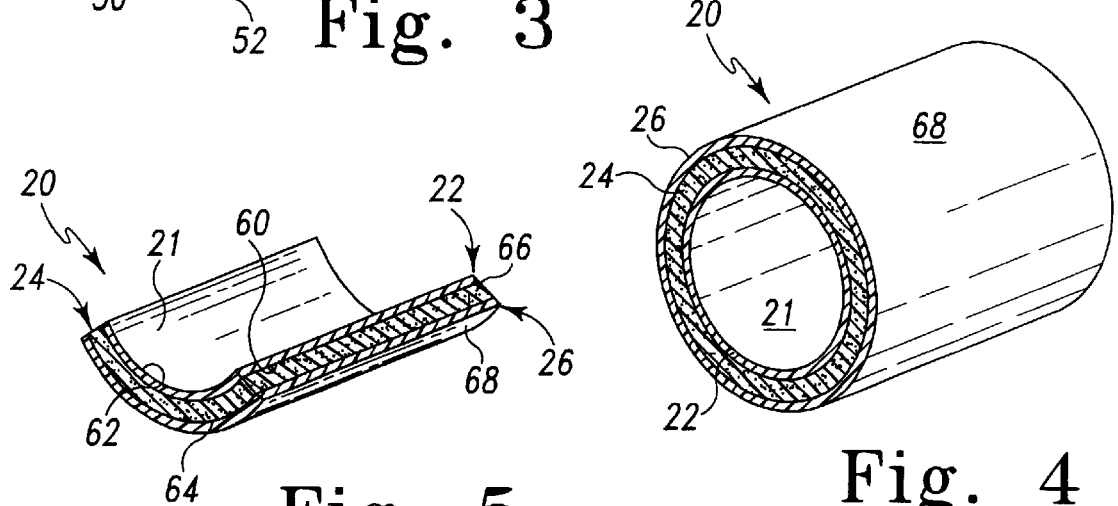
Fig. 5
Fig. 4

REINFORCED HOSE AND ASSOCIATED METHOD OF MANUFACTURE

PROVISIONAL PATENT APPLICATION

This application claims the benefit of U.S. Provisional Application Serial No. 60/202,710, filed May 10, 2000.

BACKGROUND OF THE INVENTION

The present invention relates generally to a conduit which is used to convey fluid, and more particularly to a flexible hose which is used to convey water such as a garden hose. The present invention also relates to a method of manufacturing such a hose.

Various hoses have been designed in the past which convey a fluid such as water from a fluid source to a desired location remote from the fluid source. For example, existing garden hoses have been designed to include an elongate tubular structure which has a first end which is configured to connect to an outside water faucet or spigot and a second end which is configured to connect to a lawn sprinkler or similar mechanism.

The elongate tubular structure of such existing garden hoses have been constructed in various manners. For instance, U.S. Pat. No. 4,044,799 issued to Higbee et al. discloses a hose having an outer cover, an inner tube, and a knit reinforcing fabric interposed therebetween. The outer cover includes a wall structure having a multitude of gas-filled cells interspersed throughout the wall structure of the outer cover. The inner tube has a multitude of closed gas-filled cells interspersed throughout its walls. Another example of an existing hose construction is disclosed in U.S. Pat. No. 4,644,977 issued to Arterburn. The hose of Arterburn includes an inner tube assembly, an outer cover assembly, and a textile reinforcement interposed therebetween. The inner tube assembly of Arterburn includes a thin, non-foamed inner liner and a foamed interlayer circumferentially encompassing the inner liner. Auterburn's outer cover assembly includes a first thermoplastic layer with a multitude of closed gas-filled cells and a second thermoplastic layer which is nonfoamed.

One potential drawback with hoses of the above-described construction is separation of the inner tube from the outer cover at the site of its textile reinforcement. In particular, during extended use of such hoses, water or moisture may seep between the inner tube and the outer cover at an end of the hose where a coupling is attached to the inner tube and the outer cover. Seepage between the inner tube and the outer cover may cause bubbles to form thereby causing the inner tube to become separated or otherwise detached from the outer cover. Such separation tends to cause the hose to fail.

Also, it is a continuing goal of hose designers to create a hose having improved strength. For example, when a hose is grasped and pulled by a user at one end while the other end is coupled to a water facet or spigot in order to move the outlet end of the hose as would normally occur when the user is moving the hose in order to water another part of his/her lawn, the intermediate portion of the hose is subjected to significant stresses and strains. Improving the strength of the hose to endure such stresses and strains is advantageous. Another continuing goal of hose designers to create a hose which is relatively light weight, while still possessing the strength necessary to endure such stresses and strains.

What is needed therefore is a hose which overcomes one or more drawbacks of the previously designed devices. For example, what is needed is a hose that is relatively less susceptible to having its inner tube become separated or otherwise detached from its outer cover at the site of its textile reinforcement as compared to existing hoses. Moreover, for example, what is needed is a hose that has relatively increased strength, and is relatively lighter in weight as compared to existing hoses.

SUMMARY OF THE INVENTION

In accordance with one embodiment of the present invention, there is provided a hose. The hose a tube assembly having (i) a first inner non-foamed layer, (ii) a first outer non-foamed layer positioned around the first inner non-foamed layer, and (iii) a first foamed layer interposed between the first inner non-foamed layer and the first outer non-foamed layer. The hose further includes a textile reinforcement positioned over the tube assembly. Moreover, the hose includes a cover assembly positioned over the textile reinforcement, the cover assembly having (i) a second inner non-foamed layer, (ii) a second outer non-foamed layer positioned around the second inner non-foamed layer, and (iii) a second foamed layer interposed between the second inner non-foamed layer and the second outer non-foamed layer.

Pursuant to another embodiment of the present invention, there is provided a method of manufacturing a hose. The method includes the step of extruding a tube assembly comprising (i) a first inner non-foamed layer, (ii) a first outer non-foamed layer positioned around the first inner non-foamed layer, and (iii) a first foamed layer interposed between the first inner non-foamed layer and the first outer non-foamed layer. The hose further includes the step of positioning a textile reinforcement on the tube assembly. In addition, the hose includes the step of extruding a cover assembly over the textile reinforcement after the positioning step, the cover assembly comprising (i) a second inner non-foamed layer, (ii) a second outer non-foamed layer positioned around the second inner non-foamed layer, and (iii) a second foamed layer interposed between the second inner non-foamed layer and the second outer non-foamed layer.

Pursuant to yet another embodiment of the present invention, there is provided a hose which includes a tube assembly defining a liquid passage, the tube assembly being prepared by a process which includes extruding a first inner non-foamed layer, a first foamed layer around the first inner non-foamed layer, and a first outer non-foamed layer around the first foamed layer. The further includes a textile reinforcement positioned around the tube assembly. Additionally, the hose includes a cover assembly positioned around the tube assembly, the cover assembly being prepared by a process which includes extruding a second inner non-foamed layer around the first outer non-foamed layer, a second foamed layer around the second inner non-foamed layer, and a second outer non-foamed layer around the second foamed layer.

According to still another embodiment of the present invention, there is provided a hose assembly which includes (i) a tri-lamina tube assembly having an outer surface that is made of a thermoplastic, (ii) a textile reinforcement in contact with the outer surface of the tri-lamina tube assembly, and (iii) a tri-lamina cover assembly having an inner surface that is made of the thermoplastic and surrounding the textile reinforcement and the outer surface of the tri-lamina tube assembly.

According to further embodiment of the present invention, there is provided a method of manufacturing a hose comprising the steps of (i) extruding a tri-lamina tube assembly, (ii) positioning a textile reinforcement in contact with an outer surface of the tri-lamina tube assembly, and (iii) extruding a tri-lamina cover assembly over the textile reinforcement after the positioning step so that an inner surface of the tri-lamina cover assembly contacts the outer surface of the tri-lamina tube assembly through a plurality of interstices defined in the textile reinforcement.

It is therefore an object of the present invention to provide a new and useful hose.

It is another object of the present invention to provide an improved hose.

It is yet another object of the present invention to provide a hose that is relatively less susceptible to having its inner tube become separated or otherwise detached from its outer cover at the site of its textile reinforcement as compared to existing hoses.

It is still another object of the present invention to provide a hose that has relatively increased strength as compared to existing hoses.

It is yet another object of the present invention to provide a hose that is relatively lightweight as compared to existing hoses.

It is yet an object of the present invention to provide a new and useful method of manufacturing a hose.

It is additionally an object of the present invention to provide an improved method of manufacturing a hose.

Other objects and benefits of the present invention can be discerned from the following description and accompanying drawings.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings wherein:

FIG. 1 is a partially cut away cross-sectional view of a section of a multiple layer hose in accordance with the principles of the present invention;

FIG. 2 is a cross-sectional view of a portion of an inner tube of the multiple layer hose of FIG. 1;

FIG. 3 is a perspective view of a wall section of the inner tube of FIG. 2;

FIG. 4 is a cross-sectional view of a portion of an outer cover of the multiple layer hose of FIG. 1;

FIG. 5 is a perspective view of a wall section of the outer cover of FIG. 4;

DESCRIPTION OF THE PREFERRED EMBODIMENT

Figure 6:
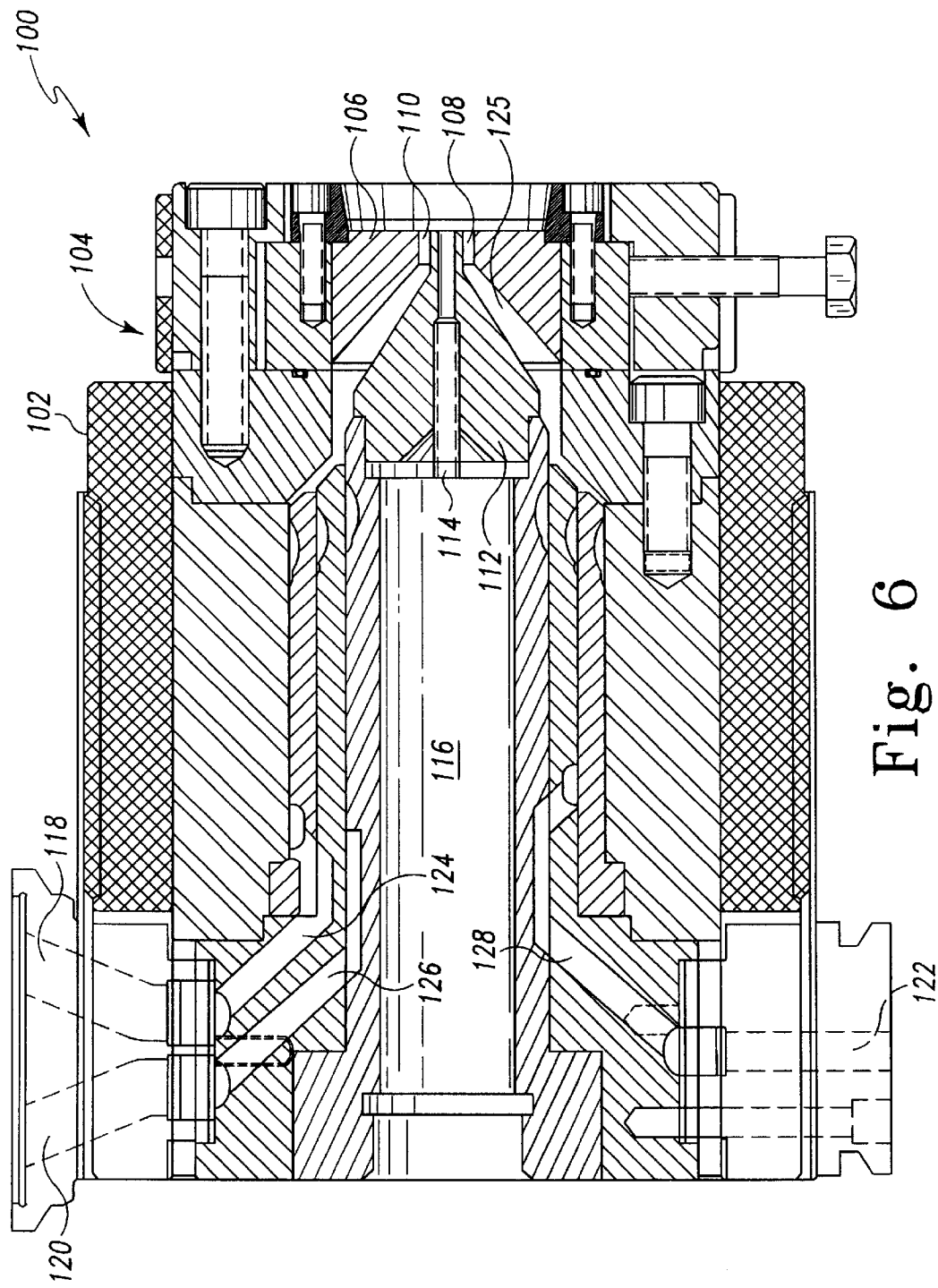
FIG. 6 is an enlarged cross-sectional view of a head of an extrusion machine with an extrusion die therein which is operable to extrude a tube assembly in accordance with the principles of the present invention.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a hose 10 having a tube assembly 12, a cover assembly 20 disposed about, over and/or around the tube assembly 12, and a textile reinforcement 30 disposed between the tube assembly 12 and the cover assembly 20. In general, the tube assembly 12 is radially inside of the cover assembly 20, while the textile reinforcement 30 is interposed between the cover assembly 20 and the tube assembly 12. It should be appreciated that at a first end of the hose 10 will include a first coupling (not shown) which is configured to connect to an outside water faucet or spigot, and similarly, a second end of the hose 10 will include a second coupling (not shown) which is configured to connect to a lawn sprinkler or similar mechanism.

The textile reinforcement 30 is preferably composed of a first textile layer 32 and a second textile layer 34. The first textile layer 32 is spirally wound around or wrapped about an outer surface 58 of an outer layer 18 of the tube assembly 12. The second textile layer 34 is in the form of a mesh, netting, woven braid, knit, webbing, or the like configuration that is circumferentially wrapped about the first textile layer 32. The first and second textile layers 32 and 34 collectively form a plurality of openings or interstices 29. It should be appreciated that the first and second textile layers 32 and 34 are positionally interchangeable. In the preferred embodiment, the first and second textile layers 32 and 34 are made from polyester. However, it should be appreciated that other textile materials may be utilized such as nylon, Kevlar®, and the like. Further, a different textile material from that described above may be used for each textile reinforcement layer.

With reference to FIGS. 2 and 3 the tube assembly 12 is shown. The tube assembly 12 is a three component tube which includes a non-foamed inner tube layer 14, a foamed intermediate tube layer or core 16 radially disposed about the non-foamed inner tube layer 14, and a non-foamed outer tube layer 18 radially disposed about the foamed tube layer 16. Note that what is termed a layer herein may be also be properly called a ply, a sheet, a lamina, or the like. The non-foamed inner tube layer 14 is preferably made from a suitably flexible polymer or thermoplastic. The foamed intermediate tube layer 16 is preferably made from a suitably flexible polymer or thermoplastic that is blown to a relatively light density onto the non-foamed inner tube layer 14 with the aid of a blowing agent such as axodicarbonamide. The blowing agent causes tiny closed air pockets to be dispersed throughout the material increasing the volume and thereby decreasing the density thereof. The non-foamed outer tube layer 18 is preferably made from a suitably flexible polymer or thermoplastic and is formed about the foamed intermediate tube layer 16. The foamed intermediate tube layer 16 is preferably thicker than the non-foamed inner tube layer 14 and the non-foamed outer tube layer 18.

The polymer or thermoplastic material used for any one or all of the various layers 14, 16, and 18 of the tube assembly 12 can be any suitable polymer or thermoplastic such as polyethylene, EVA, polyvinylchloride (PVC), nylon, or the like as are known in the art, but is preferably a flexible PVC. In the preferred embodiment, all of the layers 14, 16, and 18 of the tube assembly 12 are formed from flexible PVC.

The inner non-foamed layer 14 defines an inner surface 44 and an outer surface 46. The inner surface 42 is configured to be essentially tubular or annular in shape. The inner surface 42 defines a conduit through which a liquid (e.g. water) flows. The outer surface 46 of the non-foamed layer 14 is, as well, essentially annular. The foamed intermediate or middle layer 16 is contiguously adjacent to the outer surface 46 of the inner non-foamed layer 14. The foamed intermediate layer 16 defines an essentially annular inner surface 50 and an essentially annular outer surface 52. The inner surface 50 is in contact with the outer surface 46 of the inner non-foamed layer 14. The non-foamed outer layer 18 is contiguously adjacent to the outer surface 52 of the intermediate layer 16. The non-foamed outer layer 18 thus defines an essentially annular inner surface 56 that is in contact with the outer surface 52 of the intermediate layer 16. The non-foamed outer layer further defines an essentially annular outer surface 58. The outer surface 58 of the non-foamed outer layer 18 receives the textile reinforcement 30 (see FIG. 1) and contacts an inner surface 21 of the non-foamed inner layer 22 of the cover assembly 20 through the interstices 29 defined by the textile reinforcement 30.

With reference to FIGS. 4 and 5, the cover assembly 20 is shown. The cover assembly 20 is a three component cover which includes a non-foamed inner cover layer 22, a foamed intermediate cover layer or core 24 radially disposed about the non-foamed inner cover layer 22, and a non-foamed outer cover layer 26 radially disposed about the foamed cover layer 24. The non-foamed inner cover layer 22 is preferably made from a suitably flexible polymer or thermoplastic. The foamed intermediate cover layer 24 is preferably made from a suitably flexible polymer or thermoplastic that is blown to a relatively light density onto the non-foamed inner cover layer 22 with the aid of a blowing agent such as axodicarbonamide. The blowing agent causes tiny closed air pockets to be dispersed throughout the material increasing the volume and thereby decreasing the density thereof. The non-foamed outer cover layer 26 is preferably made from a suitably flexible polymer or thermoplastic and is formed about the foamed intermediate cover layer 24. The foamed intermediate cover layer 24 is preferably thicker than the non-foamed inner cover layer 22 and the non-foamed outer cover layer 26.

The polymer or thermoplastic material used for any one or all of the various layers 22, 24, and 26 of the cover assembly 20 can be any suitable polymer or thermoplastic such as polyethylene, EVA, polyvinylchloride (PVC), nylon, or the like as are known in the art, but is preferably a flexible PVC. In the preferred embodiment, all of the layers 22, 24, and 26 of the cover assembly 20 are formed from flexible PVC.

The inner non-foamed layer 22 defines an inner surface 21 and an outer surface 60. The inner surface 21 is configured to be essentially tubular or annular in shape. The outer surface 60 of the inner non-foamed layer 22 is, as well, essentially annular. The foamed intermediate or middle layer 24 is contiguously adjacent to the outer surface 60 of the inner non-foamed layer 22. The foamed intermediate layer 24 defines an essentially annular inner surface 62 and an essentially annular outer surface 64. The inner surface 62 is in contact with the outer surface 60 of the inner non-foamed layer 22. The non-foamed outer layer 26 is contiguously adjacent to the outer surface 64 of the intermediate layer 24. The non-foamed outer layer 26 thus defines an essentially annular inner surface 66 that is in contact with the outer surface 64 of the intermediate layer 24. The non-foamed outer layer further defines an essentially annular outer surface 68. The outer surface 68 is in contact with the environment.

Method of Manufacture

One method for making a hose in accordance with the principles of the present invention will now be discussed. In the best mode currently known, the hose 10 is preferably manufactured by extrusion technology. While many advantages of the present invention are achieved by manufacturing the hose 10 with the use of extrusion technology, some of the advantages of the present invention may be achieved by manufacturing the hose 10 with the use of other technologies. It should therefore be appreciated that the following description of the process set forth in FIG. 8 and the extrusion machines set forth in FIGS. 6 and 7 are not limiting of the various methods that may be used to manufacture the present hose.

Figure 8:
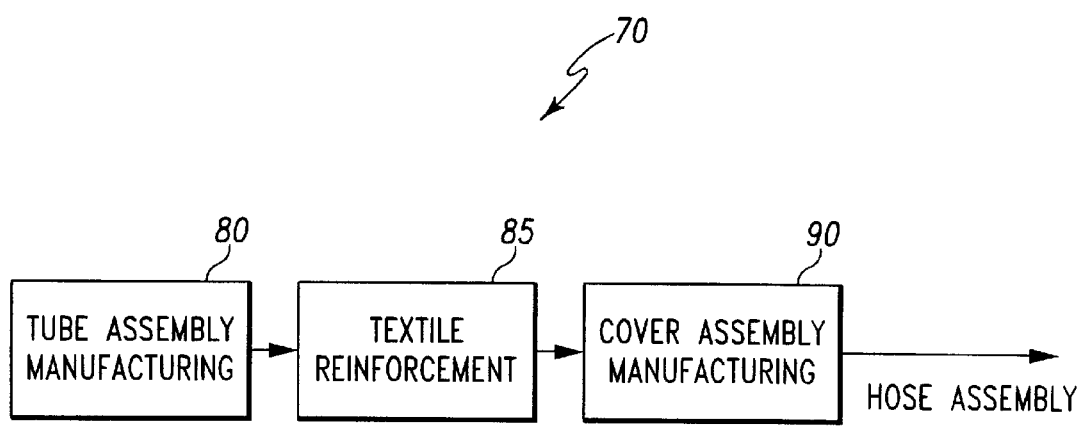
FIG. 8 is a block diagram of the general process of forming a hose in accordance with the principles of the present invention.

With reference to FIG. 8, there is shown a block diagram of the present process generally designated 70. The process generally first includes the manufacture of the tube assembly 12 (Block 80). After the tube assembly 12 has been manufactured or as the tube assembly is formed, the textile reinforcement 30 (either the spiral threading 32 or the mesh threading 34, or both) is added around the tube assembly 12 (Block 85). Specifically, the textile reinforcement 30 is added around the outer surface 58 of the outer layer 18 of the tube assembly 12. After the textile reinforcement 30 is added to the tube assembly 12, the cover assembly is manufactured over, onto, or around the tube and textile reinforcement assembly which produces the completed hose 10.

Figure 7:
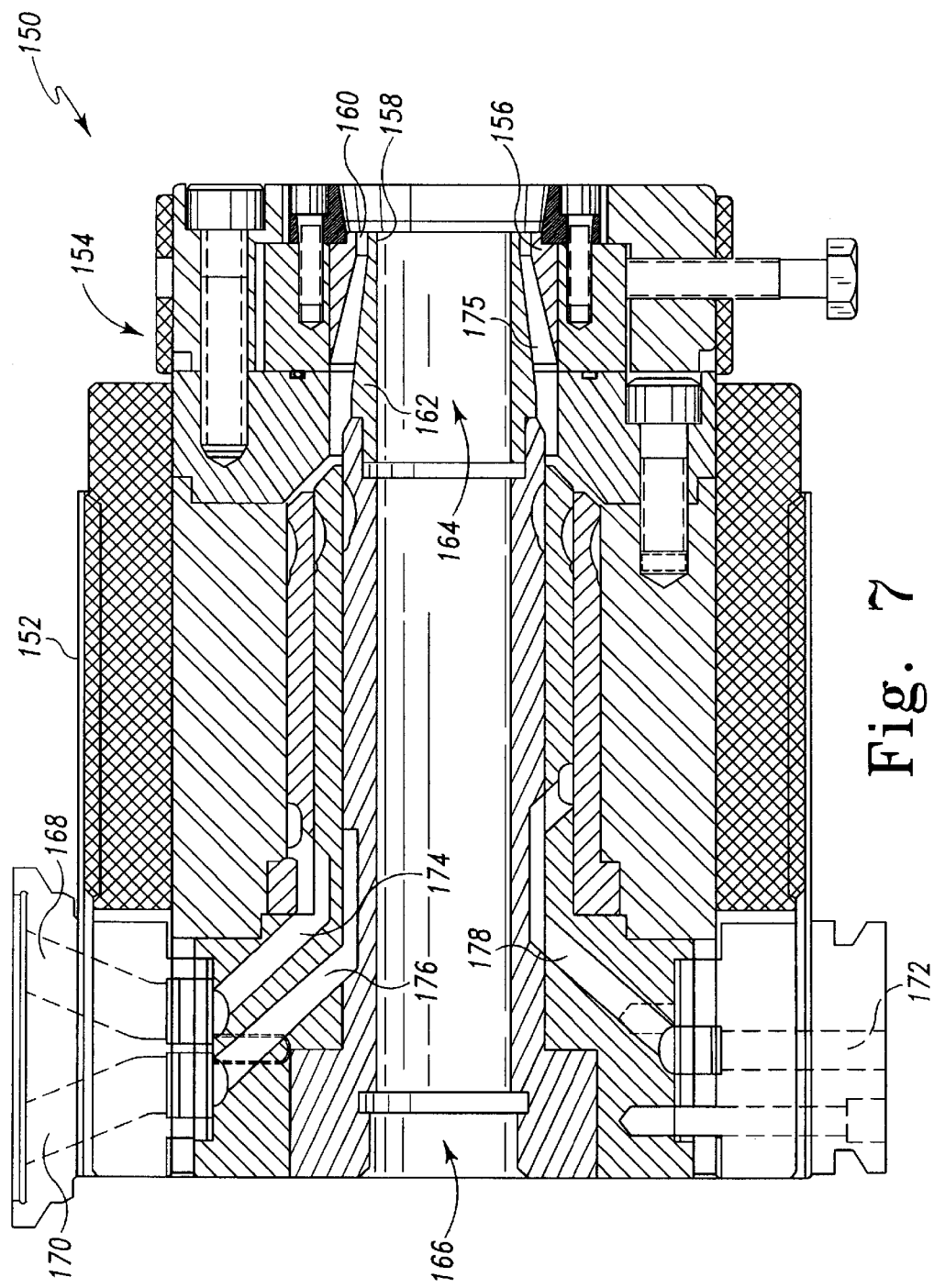
FIG. 7 is an enlarged cross-sectional view of a head of an extrusion machine with an extrusion die therein which is operable to extrude a cover assembly in accordance with the principles of the present invention.

With reference to FIG. 6, there is shown a portion of an extrusion machine generally designated 100. The extrusion machine 100 includes a housing 102 formed from a plurality of components as is known in the art, including a die or extrusion head 104 that is bolted to a component of the housing 102. The die head 104 fits over an opening of an extrusion chamber 116 defined by the housing 102. The die head 104 includes a nozzle plate 106 having a nozzle opening 110 through which the tube assembly is extruded. Behind the nozzle plate 106 is a nozzle cone or head 112 that has a nozzle 108 that extends toward the nozzle opening 110. The nozzle 108 defines the essentially annular nozzle opening 110 that essentially corresponds to the diameter of the finished tube assembly 12.

The housing 102 includes an opening, bin, hopper, or the like 118 that is in communication with passages 124. The passages 124 lead into nozzle chamber 125. The opening 118 and passages 124 accept material to form the outer layer 18 of the tube assembly 12. The opening 118 is in communication with a source of the material for the outer layer 18. The source is typically in a viscous liquid state as is known in the art.

The housing 102 also includes an opening, bin, hopper, or the like 122 that is in communication with passages 128. The passages 128 lead into nozzle chamber 125. The opening 122 and passages 128 accept material to form the middle or intermediate layer 16 of the tube assembly 12. The opening 122 is in communication with a source of the material for the intermediate layer 16 or core. The source is typically in a viscous liquid state as is known in the art.

The intermediate layer 16 is blown with the blowing agent to introduce bubbles into the material that form cells. This makes the material foamy and lightweight (less dense) that a non-blown layer of the material.

The housing 102 further includes an opening, bin, hopper, or the like 120 that is in communication with passages 126. The passages 126 lead into nozzle chamber 125. The opening 120 and passages 126 accept material to form the inner layer 14 of the tube assembly 12. The opening 120 is in communication with a source of the material for the inner layer 14. The source is typically in a viscous liquid state as is known in the art.

As the appropriate material enters the respective opening 118, 120, and 122, and flows along the respective passages 124, 126, and 128, they meet to form the various layers within the nozzle chamber 124, with one layer deposited upon another layer. This material is then extruded from the nozzle opening 110 to form the tri-lamina tube assembly 12 in any desirable length. Air or other injection gas may blown through the nozzle bore 114, introduced through the extrusion chamber 116.

The textile reinforcement is then added around the extruded tube assembly. After the textile reinforcement is added, the tube and textile assembly is fed into a second extrusion machine such as that depicted in FIG. 7. With reference now to FIG. 7 there is depicted an extrusion machine 150.

The extrusion machine 150 includes a housing 152 formed from a plurality of components as is known in the art, including a die or extrusion head 154 that is bolted to a component of the housing 152. The die head 154 fits over an opening of an extrusion chamber 166 defined by the housing 152. The die head 154 includes a nozzle plate 156 having a nozzle opening 160 through which the hose is extruded (i.e. the cover assembly over the textile and tube assembly). Behind the nozzle plate 156 is a nozzle cone or head 162 that has a nozzle 158 that extends toward the nozzle opening 160. The nozzle 158 defines the essentially annular nozzle opening 160 which corresponds to the diameter of the cover assembly 20.

The housing 152 includes an opening, bin, hopper, or the like 168 that is in communication with passages 174. The passages 174 lead into nozzle chamber 175. The opening 168 and passages 174 accept material to form the outer layer 26 of the cover assembly 20. The opening 168 is in communication with a source of the material for the outer layer 26. The source is typically in a viscous liquid state as is known in the art.

The housing 152 also includes an opening, bin, hopper, or the like 172 that is in communication with passages 178. The passages 178 lead into nozzle chamber 175. The opening 172 and passages 178 accept material to form the middle or intermediate layer 24 of the cover assembly 20. The opening 172 is in communication with a source of the material for the intermediate layer 24 or core. The source is typically in a viscous liquid state as is known in the art.

The intermediate layer 24 is blown with the blowing agent to introduce bubbles into the material that form cells. This makes the material foamy and lightweight (less dense) in comparison to a non-blown layer of the material.

The housing 152 further includes an opening, bin, hopper, or the like 170 that is in communication with passages 176. The passages 176 lead into nozzle chamber 175. The opening 170 and passages 176 accept material to form the inner layer 22 of the cover assembly 20. The opening 170 is in communication with a source of the material for the inner layer 22. The source is typically in a viscous liquid state as is known in the art.

As the appropriate material enters the respective opening 168, 170, and 172, and flows along the respective passages 174, 176, and 178, they meet to form the various layers within the nozzle chamber 175, with one layer deposited upon another layer. As well, the textile and tube assembly is fed through the extrusion chamber 166 and out of opening 164 which, when it exits the opening 164 receives the inner layer 22 thereover. The tri-lamina material is then extruded from the nozzle opening 160 to form the tri-lamina cover assembly 20 onto, over and around the textile material 30 and the outer surface 58 of the outer layer 18 of the tube assembly 12. The hose 10 that results therefrom may be extruded and/or cut into any desirable length.

It should be appreciated that the tube assembly and the cover assembly may be formed in separate extrusion machines with the textile reinforcement threading applied therebetween or from one extrusion machine designed to allow a double extrusion with integral textile reinforcement threading.

The present hose 10 has advantages over prior art hoses. Specifically, there is a substantial increase in adhesion between the tube assembly 12 and the cover assembly 20. This reduces the likelihood of water seepage between the plies that create bubbles and separation. It allows the blowing of the foam material to a lighter density for softness and lightweightness with minimal or no loss of hose integrity. Further, the non-blown inner tube layer 14 contains the liquid (e.g. water) flow. Still further, the non-blown outer cover layer 26 seals the hose assembly 10 against dirt and abrasion. Even further, the non-blown outer tube layer 18 and the non-blown inner cover layer 22 tends to allow a reduction in the amount of textile reinforcement 30 needed for adequate hose strength.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

There are a plurality of advantages of the present invention arising from the various features of the hose described herein. It will be noted that alternative embodiments of the hose of the present invention may not include all of the features described yet still benefit from at least some of the advantages of such features. Those of ordinary skill in the art may readily devise their own implementations of the hose that incorporate one or more of the features of the present invention and fall within the spirit and scope of the present invention as defined by the appended claims.

What is claimed is:

1. A hose comprising:
    a tube assembly having (i) a first inner non-foamed layer, (ii) a first outer non-foamed layer positioned around said first inner non-foamed layer, and (iii) a first foamed layer interposed between said first inner non-foamed layer and said first outer non-foamed layer;
    a textile reinforcement positioned over said tube assembly; and
    a cover assembly positioned over said textile reinforcement, said cover assembly having (i) a second inner non-foamed layer, (ii) a second outer non-foamed layer positioned around said second inner non-foamed layer, and (iii) a second foamed layer interposed between said second inner non-foamed layer and said second outer non-foamed layer.

2. The hose of claim 1, wherein said textile reinforcement is positioned in contact with said second inner non-foamed layer.

3. The hose of claim 1, wherein:
    said textile reinforcement defines a number of interstices; and
    said first outer non-foamed layer contacts said second inner non-foamed layer through said number of interstices.

4. The hose of claim 1, wherein:

said first foamed layer is thicker than said first inner non-foamed layer and said first outer non-foamed layer; and said second foamed layer is thicker than said second inner non-foamed layer and said second outer non-foamed layer.

5. The hose of claim 1, wherein said textile reinforcement comprises:

a woven layer positioned around said tube assembly; and a spiral layer interposed between said woven layer and said tube assembly.

6. The hose of claim 1, wherein said textile reinforcement comprises:

a first textile layer which includes spiral threading; and a second textile layer which includes woven threading.

7. The hose of claim 6, wherein:

said spiral threading is wound around said first outer non-foamed layer; and said woven threading overlays said spiral threading.

8. The hose of claim 1, wherein:

said first inner non-foamed layer is positioned in contact with said first foamed layer, said first foamed layer is positioned in contact with said first outer non-foamed layer, said second inner non-foamed layer is positioned in contact with said second foamed layer, said second foamed layer is positioned in contact with said second outer non-foamed layer, and said textile reinforcement defines a number of interstices though which said first outer non-foamed layer contacts said second inner non-foamed layer, whereby adhesion between said tube assembly and said cover assembly is achieved.

9. The hose of claim 1, wherein:

said first inner non-foamed layer, said first foamed layer, said first outer non-foamed layer, said second inner non-foamed layer, said second foamed layer, and said second outer non-foamed layer are each formed of PVC; and said textile reinforcement is formed of polyester.

10. A hose, comprising:

a tube assembly defining a liquid passage, said tube assembly being prepared by a process which includes extruding a first inner non-foamed layer, a first foamed layer around said first inner non-foamed layer, and a first outer non-foamed layer around said first foamed layer;

a textile reinforcement positioned around said tube assembly; and a cover assembly positioned around said tube assembly, said cover assembly being prepared by a process which includes extruding a second inner non-foamed layer around said first outer non-foamed layer, a second foamed layer around said second inner non-foamed layer, and a second outer non-foamed layer around said second foamed layer.

11. The hose of claim 10, wherein said process of preparing said cover assembly includes positioning said second inner non-foamed layer in contact with said first outer non-foamed layer of said tube assembly.

12. The hose of claim 10, wherein:

said textile reinforcement defines a plurality of interstices, and said second inner non-foamed layer of said cover assembly contacts said first outer non-foamed layer of said tube assembly through said plurality of interstices.

* * * * *